US 6,675,262 B1

(12) United States Patent
Wilson et al.

(10) Patent No.: US 6,675,262 B1
(45) Date of Patent: Jan. 6, 2004

(54) MULTI-PROCESSOR COMPUTER SYSTEM WITH CACHE-FLUSHING SYSTEM USING MEMORY RECALL

(75) Inventors: Kenneth Mark Wilson, San Jose, CA (US); Fong Pong, Mountain View, CA (US); Lance Russell, Hollister, CA (US); Tung Nguyen, Cupertino, CA (US); Lu Xu, San Jose, CA (US)

(73) Assignee: Hewlett-Packard Company, L.P., Houston, TX (US)

( * ) Notice: Subject to any disclaimer, the term of this patent is extended or adjusted under 35 U.S.C. 154(b) by 316 days.

(21) Appl. No.: 09/877,368

(22) Filed: Jun. 8, 2001

(51) Int. Cl.[7] ................................................ G06F 12/00
(52) U.S. Cl. ........................ 711/135; 711/134; 711/141; 711/142; 711/143; 711/144; 711/145; 711/133
(58) Field of Search ................................. 711/135, 133, 711/134, 136, 141, 142, 143, 118, 120, 144, 145, 147, 151, 207

(56) References Cited

U.S. PATENT DOCUMENTS

| | | | | |
|---|---|---|---|---|
| 4,426,682 A | * | 1/1984 | Riffe et al. .................. | 711/135 |
| 4,819,154 A | * | 4/1989 | Stiffler et al. .................. | 714/20 |
| 5,745,730 A | * | 4/1998 | Nozue et al. ................ | 711/135 |
| 6,122,711 A | * | 9/2000 | Mackenthun et al. ........ | 711/135 |
| 1,099,058 A1 | | 6/2001 | Wilson et al. | |
| 6,308,242 B1 | * | 10/2001 | Kim ............................ | 711/135 |

OTHER PUBLICATIONS

Docket #10990584–1, Jun. 8, 2001, Wilson et al.

U.S. patent application Ser. No. 09/258,549, filed Feb. 26, 1999, Pong.

* cited by examiner

Primary Examiner—Matthew Kim
Assistant Examiner—Zhuo H. Li

(57) ABSTRACT

A cache coherent distributed shared memory multi-processor computer system is provided with a memory controller which includes a recall unit. The recall unit allows selective forced write-backs of dirty cache lines to the home memory. After a request is posted in the recall unit, a recall ("flush") command is issued which forces the owner cache to write-back the dirty cache line to be flushed. The memory controller will inform the recall unit as each recall operation is completed. The recall unit operation will be interrupted when all flush requests are completed.

20 Claims, 3 Drawing Sheets

MULTI-PROCESSOR COMPUTER SYSTEM WITH CACHE-FLUSHING SYSTEM USING MEMORY RECALL

CROSS-REFERENCE TO RELATED APPLICATIONS

The present application contains subject matter related to a U.S. patent application entitled Ser. No. 09/258,549, filed Feb. 26, 1999, entitled "CACHE-FLUSHING ENGINE FOR DISTRIBUTED SHARED MEMORY MULTI-PROCESSOR COMPUTER SYSTEMS" by Fong Pong, which is hereby incorporated by reference.

The present application also contains subject matter related to concurrently filed U.S. patent application Ser. No. 09/877,539 entitled "MULTI-PROCESSOR COMPUTER SYSTEM WITH LOCK DRIVEN CACHE-FLUSHING SYSTEM" by Kenneth Mark Wilson, Fong Pong, Lance Russell, Tung Nguyen, and Lu Xu, which is hereby incorporated by reference.

TECHNICAL FIELD

The present invention relates generally to multi-processor computer systems and more particularly to a cache-flushing system.

BACKGROUND ART

High performance, multi-processor computer systems with a large number of microprocessors are built by inter-connecting a number of node structures, each node containing a subset of the processors and memory in the system. While the memory in the system is distributed, several of these systems support a shared memory abstraction where all the memory in the system appears as a large memory common to all processors in the system. To support high-performance, these systems typically allow processors to maintain copies of memory data in their local caches. Since multiple processors can cache the same data, these systems must incorporate a cache coherence mechanism to keep the copies coherent.

In some cache-coherent systems, each memory block (typically a portion of memory tens of bytes in size) is assigned a "home node", which maintains all necessary global information for that memory block, manages the sharing of that memory block, and guarantees its coherence. The home node maintains a directory, which identifies the nodes that possess a copy of the memory block. When a node requires a copy of the memory block, it requests the memory block from its local, private cache. If the data is found, the memory access is resolved locally. Alternatively, a remote memory access may be performed to the home node. The home node supplies the data from memory if its memory has the latest data. If another node has the latest copy of the data, the home node directs this node to forward the data to the requesting node. The data is then stored in the local cache of the requesting node or returned to the home memory and then sent to the requesting node.

In cache-coherent systems, multiple copies of the same memory block can exist in different nodes. These copies must be read-only and identical to the home memory copy. They are called "clean" copies in a "shared" state.

When a processor updates its local cache copy, it must ensure that all other copies are invalidated. The processor sends a request to the home memory for the memory block to be owned only by the processor. In response, other processors, which have clean shared copies of the memory block in their caches, must be sent a memory block recall command. Once all processors have responded that the memory block is no longer contained in their caches, the home memory sends a message back to the updating processor that it is now the sole "owner" of the memory block. Consequently, the processor has an "exclusive" and "modified" data copy, which holds the most recent value of the data. The other copies of the memory block are invalid and the copy in the home memory is "stale".

The home node employs a coherence protocol to ensure that when a node writes a new value to the memory block, all other nodes see this latest value. Coherence controllers implement this coherence functionality. First, they implement a coherence controller for each memory unit, which maintains coherence of all memory blocks in that memory unit. Second, the functionality of the coherence controller is integrated with the functionality of the System Control Unit (SCU) of the associated memory unit.

The SCU provides the control and the path for data movement for the following sources and destinations within the node: the processors within the node; the local (node) portion of the memory system; the network connecting all of the nodes of the multi-processor computer system; and the input/output (I/O) system of the local node.

However, a serious problem in the state-of-art cache-coherent shared-memory multiprocessor system designs is that the memory copy is stale after the crash of the owner node. In other words, the most recent value of a memory block is lost when the cache content is irretrievable at a failed owner node.

In many situations, the software may demand a selective cache-flushing scheme in order to define a synchronization point, at which the most recent value of a memory block is reflected at the home memory by flushing the owner cache.

In today's processor designs, cache flushing is normally implemented as an expensive operation, which may result in wiping out the entire cache rather than the desired cache blocks alone. Although some processors provide selective cache-flushing instructions, there is no guarantee of the correctness unless the cache-flushing instruction has system-wide semantics, which are prohibitively expensive.

Thus, a system has been long sought and long eluded those skilled in the art, which would provide an efficient implementation of transactional memory.

DISCLOSURE OF THE INVENTION

The present invention provides a cache coherent distributed shared memory multiprocessor computer system with programmable selective cache flushing.

The present invention further provides a cache coherent distributed shared memory multi-processor computer system which allows programmers to selectively force write-backs of dirty cache lines to home memory.

The present invention provides a multi-processor computer system which includes a processor with a cache connected thereto, a memory operatively connected to the processor, and a memory controller operatively connected to the memory for controlling access to the memory. The memory controller includes a recall unit operatively connected to the cache. The recall unit includes a triggering mechanism for providing a trigger signal to start a memory recall operation, a recall unit queue mechanism operatively connected to the triggering mechanism, and a control mechanism operatively connected to the recall unit queue mechanism for controlling the recall unit. The memory controller further includes a state machine operatively connected to the recall unit queue mechanism, the cache, and the memory for recalling information from the cache to the memory.

The present invention further provides a method for recalling memory within a cache for use in a multi-processor computer system. The multi-processor computer system includes a processor with the cache connected thereto, a memory operatively connected to the processor, a memory controller operatively connected to the memory for controlling access to the memory. The memory controller includes a recall unit. The method including the steps of: (a) providing to the recall unit addresses of memory locations within the cache that are to be recalled; (b) generating a trigger signal in the recall unit to start memory recall operations; (c) providing to the cache the memory locations within the cache that are to be recalled; (d) providing a response signal to the recall unit as each memory recall operation is completed; and (e) providing an interrupt signal to the processor when all memory recall operations are completed.

The above and additional advantages of the present invention will become apparent to those skilled in the art from a reading of the following detailed description when taken in conjunction with the accompanying drawings.

BEST MODES FOR CARRYING OUT THE INVENTION

Figure 1:
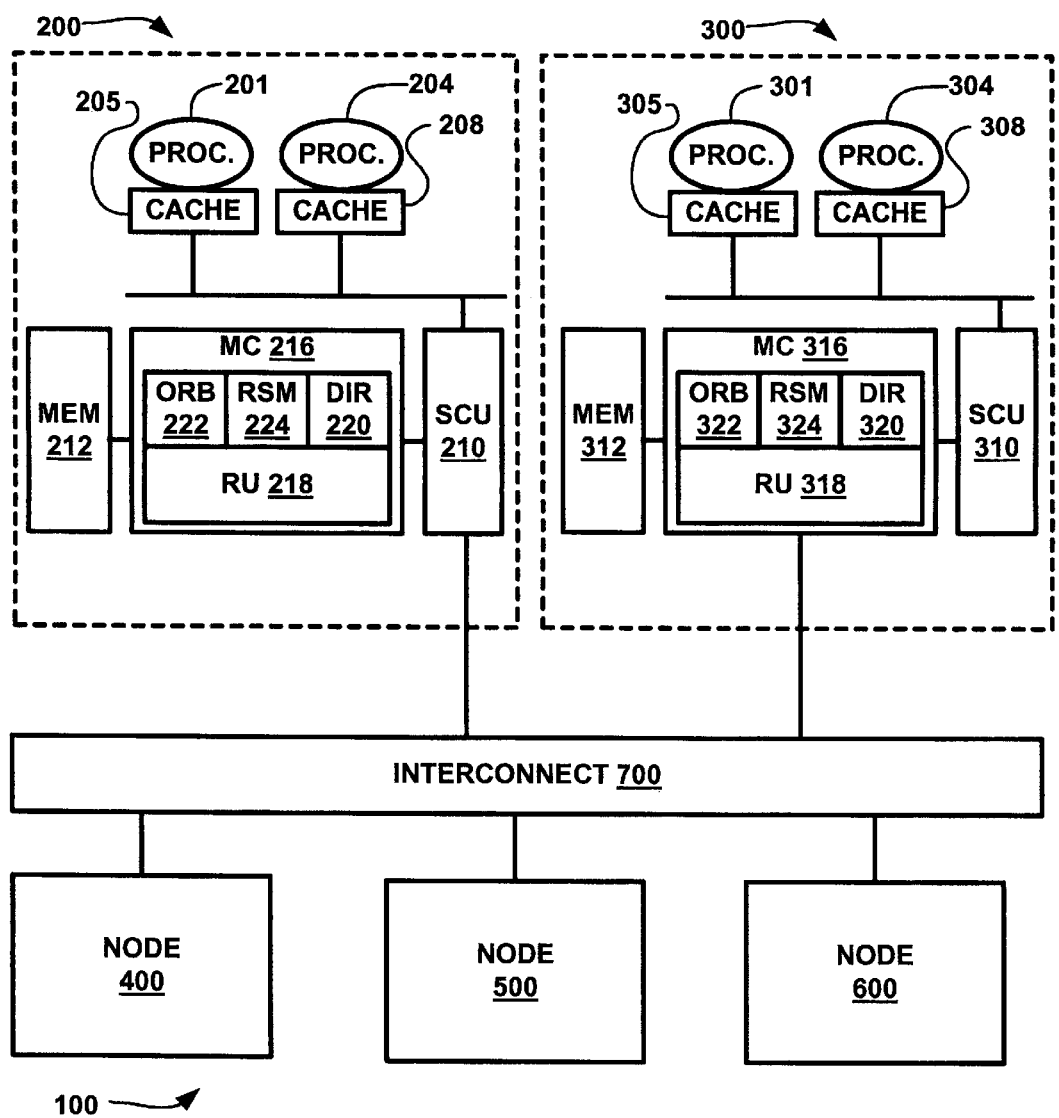
FIG. 1 is a cache coherent Distributed Shared Memory (DSM) multiprocessor computer system according to the present invention.

Referring now to FIG. 1, therein is shown a cache coherent Distributed Shared Memory (ccDSM) multi-processor computer system 100 according to the present invention. It should be understood that the system shown is for illustrative purposes only since the present invention is applicable to all architecture designs with caches. The multi-processor computer system 100 has a plurality of nodes, such as nodes 200, 300, 400, 500 and 600. The nodes 200, etc. are operatively connected to an interconnect 700, which is part of an interconnection network which includes crossbar switches and links as are well known to those skilled in the art.

Each node contains a plurality of processors and caches. For example, the node 200 contains processors 201 through 204 (with only the first and last processors shown) and respective caches 205 through 208 (with only the first and last caches shown). The caches are operatively connected to a System Control Unit (SCU) 210. The SCU 210 is operatively connected to a local node memory 212. The SCU 210 provides the control and the path for data movement for various sources and destinations within or connected to the node 200. The sources and destinations include: the processors 201 through 204 within the node; the local node memory 212; the interconnect 700; and the input/output (I/O) system of the local node (not shown). The local node memory 212 is operatively connected to a memory controller 216. The memory controller 216 is operatively connected to the SCU 210. The memory controller 216 controls the manner in which memory arrays within the local node memory 212 are accessed. The memory controller, 216 includes a recall unit (RU) 218, a directory (DIR) 220, an outstanding recalls buffer (ORB) 222, and a recall state machine (RSM) 224. The RSM 224 is operatively connected to the directory 220 and the ORB 222. The ORB 222 is operatively connected to the RU 218. Almost all multi-processor systems contain equivalent units to the ORB 222 and the RSM 224. The directory 220 keeps record of the location of data in the local node memory 212 and the caches 205 through 208. The RU 218 is selectively programmable to generate a memory recall command by providing addresses of dirty cache lines to be flushed to the ORB 222. The ORB 222 maintains a buffer of outstanding recalls. When the recall signal occurs, the RSM 224 flushes all the cache lines containing the data to be flushed based on the addresses provided by the ORB 222, as will later be explained.

The RU 218 can be programmed in one of two methods. The first method involves programming to generate a memory recall (flush) command immediately after a new memory block is entered into the RU 218 or when RU 218 has received a recall operation request. In this case, a recall will start immediately and the new memory block stays within the RU 218 until all caches containing the new memory block respond that the memory recall command has been completed. The other method involves programming to collect, or buffer, a list of recalls until the RU 218 receives a command to begin all of the recalls.

Upon completion of the memory recall command the RU 218 either quietly removes the memory block that started the recall or while removing the memory block sends out a return signal to the original requesting processor that the memory recall has been completed. The return signal can then be used by the original requesting processor, the operating system, and the other processors to establish that the operation has been completed and the next desired step can be performed. If the recalls are identified as a group within the RU 218, then only one return signal is required at the completion of all the recalls within the group.

Similarly, the node 300 contains processors 301 through 304 (with only the first and last processors shown) and respective caches 305 through 308 (with only the first and last processors shown). The caches are operatively connected to a System Control Unit (SCU) 310. The SCU 310 is operatively connected to a local node memory or home memory 312. The SCU 310 provides the control and the path for data movement for various sources and destinations within or connected to the node 300. The home memory 312 is operatively connected to a memory controller 316. The memory controller 316 is operatively connected to the SCU 310. The memory controller 316 includes a recall unit (RU) 318, a directory 320, an outstanding recalls buffer (ORB) 322, and a recall state machine (RSM) 324. The RSM 324 is operatively connected to the directory 320 and the ORB 322. The ORB 322 is operatively connected to the RU 318. The directory 320 keeps record of the location of data in the home memory 312 and the caches 305 through 308. The RU 318 is selectively programmable to generate a memory recall command by providing addresses of dirty cache lines to be flushed to the ORB 322. The ORB 322 maintains a buffer of outstanding recalls. The RSM 324 flush dirty cache lines, or lines with stale data, based on the addresses provided by the ORB 322 as will later be explained.

The other nodes 400, 500, etc. are substantially the same as the nodes 200 and 300.

Figure 2:
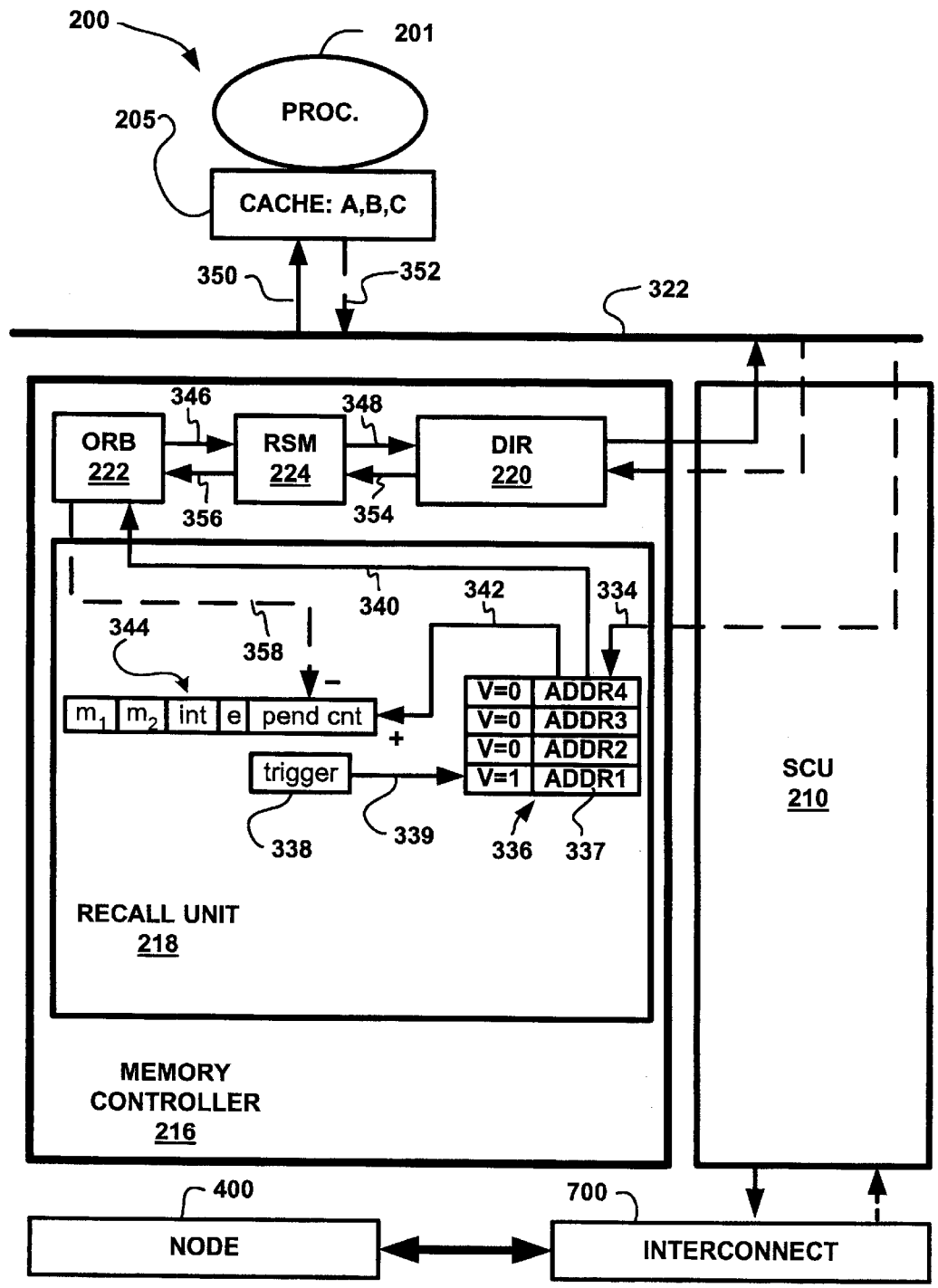
FIG. 2 is a functional block diagram of a memory controller according to the present invention.

Referring now to FIG. 2, therein is shown the node 200 with the processor 201 and its cache 205. The cache 205 contains a number of memory locations, for example, A, B, and C, which contain a series of values. The cache 205 is operatively connected to a node bus 332, which transmits signals to and from the cache 205 to the SCU 210. The SCU 210 is shown operatively connected to the interconnect 700 and through the interconnect 700 to the other nodes, such as the node 400. The RU 218 is shown operatively connected to the node bus 332 through the SCU 210 and also through the directory 220, the RSM 324, the ORB 222, and the SCU 210. For simplicity of illustration, the local node memory 212 is not shown in FIG. 2.

Also shown in the RU 218, by a functional block diagram, are a RU queue 336 and its related elements according to the present invention. The cache 205 is operatively connected by a memory mapped port 334 to the core logic, which is the RU queue 336 in the RU 218. The RU queue 336 includes a plurality of ADDR registers 337. The RU queue 336 is nonblocking and stateless, and includes a first-in-first-out (FIFO) architecture. The RU queue 336 is a bookkeeping structure to keep track of all the addresses (ADDR1 through ADDR4) of the cache lines to be flushed. A V bit in the RU queue V bit field indicates the addresses that are valid. Reads to a RU port 334 will return zero if the RU queue 336 is not ready to accept new requests. A non-zero value return means that the RU queue 336 is ready and that a new request can be issued, or launched. To launch a request, the software must issue a write to the RU port 334 with the addresses of the cache line to be flushed. As soon as the request is en-queued, the V bit is set.

A CFE trigger 338 is operatively connected to the RU queue 336. The CFE trigger 338 provides a trigger signal 339 which is used to initiate a memory recall or flush. In one embodiment, the CFE trigger 338 is activated by software executing on the processor 201 reading a specific register. This may be performed through a memory map, in which case it is handled by a load instruction command.

In response to the trigger signal 339, the RU queue 336 provides a "flush" request signal 340 to the ORB 222. The RU queue 336 is also operatively connected to provide an increment signal 342 to a control and status register (CSR) 344. When a "flush" request is launched, the corresponding entry is de-queued.

The CSR 344 has five fields. The first field is for a first programmable mode bit, or "$m_1$" bit, which describes a first execution mode. When the m1 bit is not set, the RU 218 launches the recall request as soon as a new memory block is entered into the RU queue 336 (on-the-fly mode). If the $m_1$ bit is set, the RU queue 336 will buffer a list of recalls until the RU queue 336 receives a trigger signal to begin all of the recalls.

The second field is for a second programmable mode bit, or "$m_2$" bit, which describes a second execution mode. When the $m_2$ bit is not set, the ADDR registers 337 in the RU queue 336 are cleared when a corresponding recall operation is completed. If the $m_2$ bit is set, the RU queue 336 will retain the content of the ADDR registers 337 even after the corresponding recall operation is completed. This would allow a single read operation to facilitate a memory recall if the same cache line(s) are to be retrieved in subsequent operations as will later be explained.

The third field is for an interrupt-enable bit, or "int" bit. By setting up the "int" field, an interrupt will be generated at the completion of all prior issued recall requests.

The fourth field is for the ORed logic value of all the valid bits of the RU queue 336 and is designated as the "e" field.

The fifth field indicates a number which is the difference between the number of flushing operations that have been issued to the interconnect 700 and the number of flushing operations that are yet to be acknowledged as being completed. The fifth field is designated as the "pend cnt" field. The "e" field is read-only. Writing to the CSR 344 does not change the content of the "e" field. The "$m_1$", "$m_2$", "int" and "pending cnt" are readable and writeable.

Figure 3:
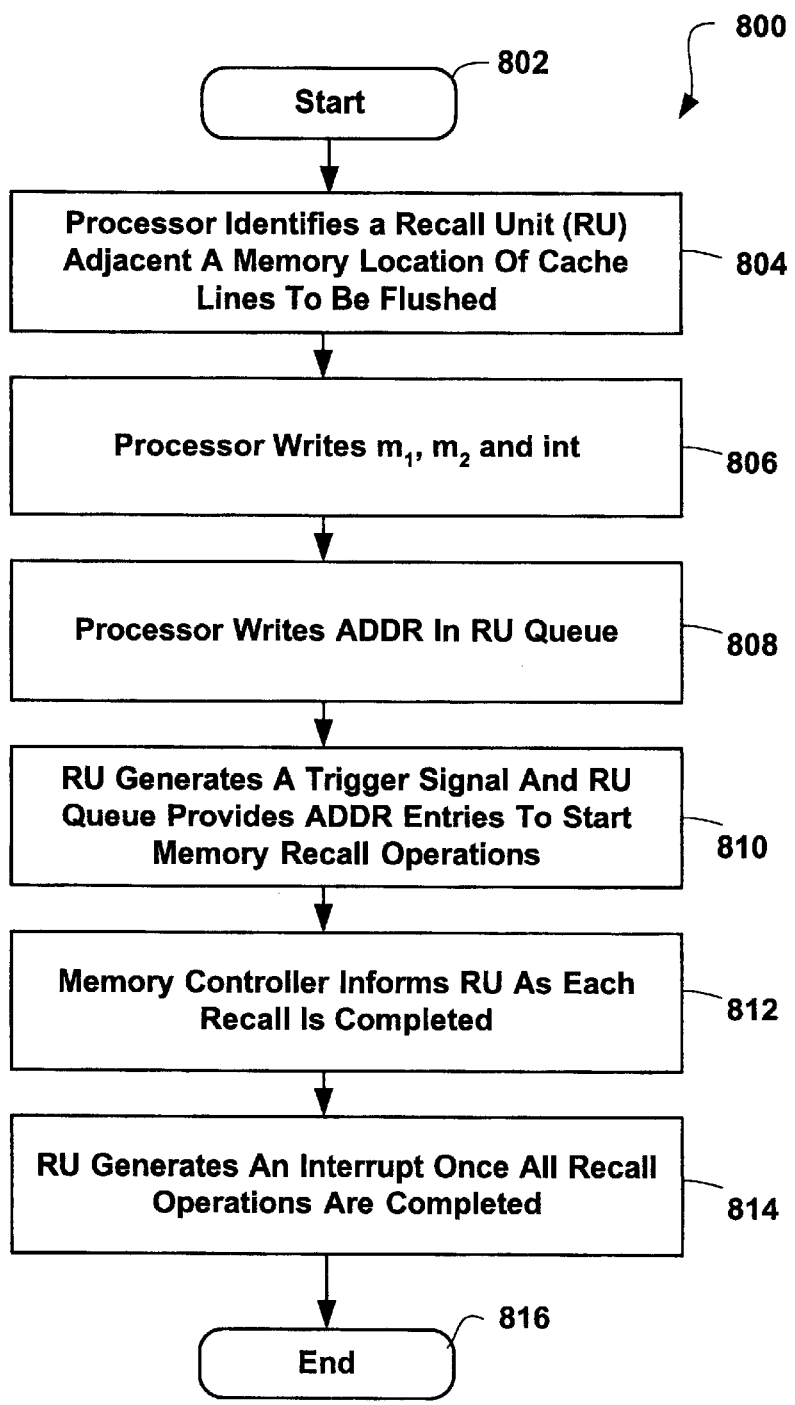
FIG. 3 is a flowchart of a method for performing memory recall for a DSM multiprocessor computer system according to the present invention.

Referring now to FIG. 3, therein is shown a flowchart 800 of the operation of a cache-flushing system for a multi-processor computer system 100 as shown in FIG. 1 and FIG. 2 in accordance with the present invention.

In one embodiment, the method starts in a step 802 and proceeds to a first step 804 with the processor 201 identifying a RU 218 which is adjacent to memory locations of cache lines that are to be recalled (or flushed).

In a second step 806, the processor 201 writes values for "$m_1$", "$m_2$", and "int" in the RU queue 336 of the RU 218.

In a third step 808, the processor 201 writes the addresses of the cache lines to be flushed in the ADDR registers 337 of the RU queue 336.

In a fourth step 810, the RU 218 generates a trigger signal 339 and the RU queue 336 provides the first entry of the ADDR registers 337 to the memory controller 216 via a "flush" request signal 340 to begin the cache line recall.

Referring again to FIG. 2, the ORB 222 provides a "flush" request signal 346 to the RSM 224 in response to the "flush" request signal 340. The "flush" request signal 346 will appear as the request signal 348 through the directory 220 on the node bus 322. The request signal 350 out of the node bus 332 will go to any other caches containing the data, even in other nodes, such as the node 400. The value of a cache line in the cache 205 which has an address corresponding to the address in the first entry of the ADDR registers 337 will be flushed out of the cache 205 and onto the node bus 332. Then a flush response signal 352 will be sent back to memory controller 216 via node bus 332. The response signal 354 out of node bus 332 through the directory 220 will go to the RSM 224 and onto ORB 222 as a response signal 356.

It should be noted that the memory controller 216 may be designated with a predetermined number of recalls which are allowed to be active at one time. If this predetermined number has not be exceeded the next memory line recall can be sent to the memory controller 216 before the first memory recall has finished.

Referring again to FIG. 3, in a fifth step 812, the memory controller 216 informs the RU 218 as each cache line recall is completed. The response signal 358 out of the ORB 222 will be sent to the "pend cnt" register of the CSR 344 as a decrement signal.

In a sixth step 814, the RU 218 generates an interrupt once all recall operations are completed. The interrupt is being provided to the processor 201 to let the software and hardware of the processor 201 know that all the recall operations have completed. The operation will be interrupted until the next flush operation is desired.

It should be noted that if $m_2$ is not set, the address of each recalled cache line will be cleared from the ADDR registers 337 of the RU queue 336 when it is sent to the memory controller 216. However, if $m_2$ is set the addresses of the recalled cache lines remain in the ADDR registers 337 of the RU queue 336 after they were sent to the memory controller 216. In this case, when the CFE trigger 338 is activated to provide trigger signal 339, the recall cycle starts with the step 810.

It should be note that the present invention can be used to recall shared cache lines as well as exclusive cache lines. Furthermore, cache lines can be recalled from any cache in a ccDSM multi-processor computer system. Moreover, the RU can be used to retrieve cache lines before a series of writes are performed, such as triggering the recall command before acquiring a lock. In addition, the present invention increases system performance by causing other processors to relinquish the cache line before it is required by the locking processor, similar to a "prefetch" operation to cause an idle memory state. Also, since a recall command is a valid command in most multi-processor computer systems, the present invention is readily adaptable to be used in such multi-processor computer systems. Finally, for performance enhancement a memory controller may includes more than one RU.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A multi-processor system having a processor with a cache connected thereto, a memory operatively connected to the processor, and a memory controller operatively connected to the memory for controlling access to the memory, the memory controller comprising:
   a recall unit operatively connected to the cache, the recall unit including:
      a triggering mechanism for providing a trigger signal to the recall unit to start a memory recall operation,
      a recall unit queue mechanism operatively connected to the triggering mechanism and the cache for holding cache information, and
   a control mechanism operatively connected to the recall unit queue mechanism for controlling the recall unit, the control mechanism includes a first programmable bit which determines a first execution mode, wherein:
      when the first programmable bit is not set, the recall unit will launch a recall request as soon as a new memory block is entered into the recall unit queue mechanism, and
      wh
en the first programmable bit is set, the recall unit will buffer a list of recall operations until the recall unit queue mechanism receives the trigger signal from the triggering mechanism to launch the recall request; and
   a state machine operatively connected to the recall unit queue mechanism, the cache, and the memory for recalling information from the cache to the memory.

2. The multi-processor system as claimed in claim 1 wherein:
   the recall unit queue mechanism includes a plurality of address registers capable of storing a plurality of memory locations; and
   the recall unit queue mechanism is capable of providing flush requests.

3. The multi-processor system as claimed in claim 2 wherein:
   the plurality of address registers includes first-in-first-out architectures.

4. The multi-processor system as claimed in claim 1 wherein:
   the triggering mechanism is operatively connected to and causes the recall unit queue mechanism to provide a flush request to start the recall unit.

5. The multi-processor system as claimed in claim 1 wherein:
   the control mechanism includes a control and status register for maintaining the mode of operation of the recall unit queue mechanism and for stopping the operation thereof when all flush requests have been completed.

6. The multi-processor system as claimed in claim 1 wherein the control mechanism includes a second programmable bit which determines a second execution mode, wherein:
   when the second programmable bit is not set, the address registers of the recall unit queue mechanism will clear the plurality of memory locations stored therein after the memory recall operation is completed; and
   when the second programmable bit is set, the address registers of the recall unit queue mechanism will not clear the plurality of memory locations stored therein after the memory recall operation is completed.

7. The multi-processor system as claimed in claim 1 including:
   an outstanding recall buffer mechanism operatively connected to the recall unit queue mechanism, the control mechanism, and the state machine for maintaining information about outstanding recalls.

8. A multi-processor computer system having a processor with a cache connected thereto, a memory operatively connected to the processor, and a memory controller operatively connected to the memory for controlling access to the memory, the memory controller comprising:
   a recall unit operatively connected to the cache, the recall unit including:
      a triggering mechanism for providing a trigger signal to the recall unit to start a memory recall operation,
      a recall unit queue mechanism operatively connected to the triggering mechanism and the cache, the recall unit queue mechanism capable of providing flush requests and including a plurality of address registers capable of storing a plurality of memory locations; and
   a control mechanism operatively connected to the recall unit queue mechanism for controlling the recall unit, the control mechanism includes a first programmable bit which determines a first execution mode, wherein:
      when the first programmable bit is not set, the recall unit will launch a recall request as soon as a new memory block is entered into the recall unit queue mechanism; and
      when the first programmable bit is set, the recall unit will buffer a list of recall operations until the recall unit queue mechanism receives the trigger signal from the triggering mechanism to launch the recall request; and
   a state machine operatively connected to the recall unit queue mechanism, the cache, and the memory for recalling information from the cache to the memory.

9. The multi-processor system as claimed in claim 8 wherein: the plurality of address registers uses first-in-first-out architectures.

10. The multi-processor system as claimed in claim 8 wherein:
   the control mechanism includes a control and status register for maintaining the mode of operation of the recall unit queue mechanism and for stopping the operation thereof when all flush requests have been completed.

11. The multi-processor system as claimed in claim 8 wherein the control mechanism includes a second programmable bit which determines a second execution mode, wherein:
   when the second programmable bit is not set, the address registers of the recall unit queue mechanism will clear the plurality of memory locations stored therein after the memory recall operation is completed; and
   when the second programmable bit is set, the address registers of the recall unit queue mechanism will not clear the plurality of memory locations stored therein after the memory recall operation is completed.

12. The multi-processor system as claimed in claim 8 including:
an outstanding recall buffer mechanism operatively connected to the recall unit queue mechanism, the control mechanism, and the state machine for maintaining information about outstanding recalls.

13. A multi-processor computer system having a processor with a cache connected thereto, a memory operatively connected to the processor, and a memory controller operatively connected to the memory for controlling access to the memory, the memory controller comprising:
a recall unit operatively connected to the cache, the recall unit including:
a triggering mechanism for providing a trigger signal to the recall unit to start a memory recall operation,
a recall unit queue mechanism operatively connected to the triggering mechanism and the cache for holding cache information, the recall unit queue mechanism including a plurality of address registers capable of storing a plurality of memory locations in a first-in-first-out sequence, the recall unit queue mechanism responsive to the triggering mechanism to provide flush requests to start the recall unit, and
a control mechanism operatively connected to the recall unit queue mechanism, the control mechanism including a control and status register for maintaining the mode of operation of the recall unit queue mechanism and for stopping the operation thereof when all flush requests have been completed, the control mechanism includes a first programmable bit which determines a first execution mode, wherein:
when the first programmable bit is not set, the recall unit will launch a recall request as soon as a new memory block is entered into the recall unit queue mechanism; and
when the first programmable bit is set, the recall unit will buffer a list of recall operations until the recall unit queue mechanism receives the trigger signal from the triggering mechanism to launch the recall request;
a state machine operatively connected to the recall unit queue mechanism, the cache, and the memory for recalling information from the cache to the memory; and
an outstanding recall buffer mechanism operatively connected to the recall unit queue mechanism, the control mechanism, and the state machine for maintaining information about outstanding recalls.

14. In a multi-processor computer system comprising a processor with a cache connected thereto, a memory operatively connected to the processor, and a method for recalling a plurality of memory locations within the cache, comprising:
(a) providing a memory controller having a recall unit,
(b) providing to the recall unit the plurality of memory locations within the cache that are to be recalled, the recall unit includes a plurality of address registers for storing the plurality of the memory locations;
(c) generating a trigger signal in the recall unit to start at least one memory recall operations;
(d) providing to the cache the plurality of the memory locations within the cache that are to be recalled; and
(e) providing a response signal to the recall unit as each memory recall operation is completed, providing the response signal to the recall unit as each memory recall operation is completed clears a corresponding plurality of memory locations stored in the plurality of address registers.

15. The method for recalling a plurality of memory locations within a cache as claimed in claim 14 including:
providing an interrupt signal to the processor when all memory recall operations are completed.

16. The method for recalling a plurality of memory locations within a cache as claimed in claim 14 wherein:
generating a trigger signal in the recall unit to start at least one memory recall operation generates a trigger signal after a plurality of recall operation requests have been buffered by the recall unit.

17. The method for recalling a plurality of memory locations within a cache as claimed in claim 14 wherein:
generating a trigger signal in the recall unit to start at least one memory recall operation generates a trigger signal after the recall unit has received a recall operation request.

18. The method for recalling a plurality of memory locations within a cache as claimed in claim 14 wherein:
the recall unit includes a plurality of address registers for storing the plurality of the memory locations; and
providing a response signal to the recall unit as each memory recall operation is completed does not clear a corresponding plurality of memory locations stored in the plurality of address registers.

19. In a multi-processor computer system comprising a processor with a cache connected thereto, a memory operatively connected to the processor, and a method for recalling a plurality of memory locations within the cache, comprising:
(a) providing a memory controller having a recall unit, the recall unit having a plurality of address registers for storing the plurality of the memory locations;
(b) providing to the recall unit the plurality of memory locations within the cache that are to be recalled, the recall unit includes a plurality of address registers for storing the plurality of the memory locations;
(c) generating a trigger signal in the recall unit to start a plurality of memory recall operations after a plurality of recall operation requests have been buffered by the recall unit;
(d) providing to the cache the plurality of the memory locations within the cache that are to be recalled; and
(e) providing the response signal to the recall unit as each memory recall operation is completed clears a corresponding plurality of memory locations stored in the plurality of address registers.

20. The method for recalling a plurality of memory locations within a cache as claimed in claim 19 wherein:
providing a response signal to the recall unit as each memory recall operation is completed;
clearing a corresponding plurality of memory locations stored in the plurality of address registers as each memory recall operation is completed; and
providing an interrupt signal to the processor when all the plurality of memory recall operations is completed.

* * * * *